United States Patent
Schneider

(10) Patent No.: US 6,943,726 B2
(45) Date of Patent: Sep. 13, 2005

(54) DEVICE FOR SEARCHING A PARKING SPACE

(75) Inventor: Robert Schneider, Burgrieden (DE)

(73) Assignee: DaimlerChrysler AG, Stuttgart (DE)

( * ) Notice: Subject to any disclaimer, the term of this patent is extended or adjusted under 35 U.S.C. 154(b) by 309 days.

(21) Appl. No.: 10/430,034

(22) Filed: May 6, 2003

(65) Prior Publication Data

US 2003/0210173 A1 Nov. 13, 2003

(30) Foreign Application Priority Data

May 8, 2002 (DE) .......................... 102 20 837

(51) Int. Cl.$^7$ .............................................. G01S 13/93
(52) U.S. Cl. .......................... 342/70; 342/27; 342/118; 342/175; 342/195; 367/87; 367/93; 367/99; 180/167; 180/168; 180/169
(58) Field of Search ................................ 180/167–169; 701/300, 301, 1, 36; 367/87–116, 909; 340/901–903, 932.2, 933, 942, 943, 988, 425.5, 435–439; 342/23, 24, 27, 28, 52, 56, 70–72, 118–146, 175, 192–197

(56) References Cited

U.S. PATENT DOCUMENTS

| | | | | |
|---|---|---|---|---|
| 5,285,205 A | * | 2/1994 | White .................... 340/932.2 |
| 5,587,938 A | * | 12/1996 | Hoetzel ........................ 701/1 |
| 5,646,614 A | * | 7/1997 | Abersfelder et al. ..... 340/932.2 |
| 5,731,781 A | * | 3/1998 | Reed ............................ 342/70 |
| 5,757,320 A | * | 5/1998 | McEwan ...................... 342/22 |
| 5,774,091 A | * | 6/1998 | McEwan ...................... 342/22 |
| 5,793,309 A | * | 8/1998 | Nellson ................... 340/932.2 |
| 6,061,002 A | * | 5/2000 | Weber et al. ............ 340/932.2 |
| 6,097,314 A | * | 8/2000 | Desens et al. .......... 340/932.2 |
| 6,239,738 B1 | | 5/2001 | Wanielik et al. ............. 342/70 |
| 6,246,337 B1 | * | 6/2001 | Rosenberg et al. ...... 340/932.2 |
| 6,249,233 B1 | * | 6/2001 | Rosenberg et al. ...... 340/932.2 |
| 6,266,609 B1 | * | 7/2001 | Fastenrath ............... 340/932.2 |
| 6,411,867 B1 | * | 6/2002 | Sakiyama et al. ............. 701/1 |
| 6,567,726 B2 | * | 5/2003 | Sakiyama et al. ............. 701/1 |
| 6,583,753 B1 | * | 6/2003 | Reed .......................... 342/70 |
| 6,646,568 B2 | * | 11/2003 | MacPhail et al. ........ 340/932.2 |
| 6,819,284 B2 | * | 11/2004 | Maier et al. .................. 342/70 |

FOREIGN PATENT DOCUMENTS

| | | |
|---|---|---|
| DE | 19600059 | 7/1997 |
| DE | 19809416 | 9/1999 |
| WO | 9747991 | 12/1997 |

* cited by examiner

*Primary Examiner*—Bernarr E. Gregory
(74) *Attorney, Agent, or Firm*—Davidson, Davidson & Kappel, LLC

(57) ABSTRACT

A device for detecting parking spaces for vehicles includes a distance-measuring beam-type sensor system disposed on a road vehicle, and a signal processing system. The distance-measuring beam-type sensor system directs a measuring beam into an area in front of the vehicle so as to detect free areas in the traffic space that are potential parking spaces. The signal processing unit examines, upon a detecting of a free area, the dimensions of the free area and the suitability of the free area for parking.

22 Claims, 1 Drawing Sheet

DEVICE FOR SEARCHING A PARKING SPACE

Priority is claimed to German patent application 102 208 837.9, filed May 8, 2002, and which is hereby incorporated by reference herein.

The invention relates generally to a device for detecting parking spaces for vehicles, and in particular to a device for detecting parking spaces for vehicles including a beam-type sensor system oriented on the road vehicle in such a way that the measuring beams which are to be used for detecting parking spaces within the scope of the signal processing are directed into the area in front of the vehicle.

BACKGROUND

A series of parking aids are known for supporting the drivers of motor vehicles during parking. In the simplest case, these are proximity/distance sensors that warn against collision with other vehicles, curbs and other obstacles.

More complex systems determine here the size of a parking space which has already been detected as a possibility by the driver and perform the actual parking procedure by means of fully automatic transverse and longitudinal guidance.

Patent document WO 97/47991 A1 thus describes a method for determining and dimensioning free spaces between vehicles parked at the edge of the road. Here, the intermediate space is sensed as the measuring device drives by using a distance-resolving sensor.

Patent document DE 198 09 416 A1 discloses a system for supported parking in which objects in the proximity around the motor vehicle and their distances from the motor vehicle are sensed by an all-round sensor system with a multiplicity of distance sensors. After a potential parking space has been driven to, it is sensed by means of sensors arranged on the motor vehicle. A processing device which is connected downstream of the sensors determines the size of the potential parking space from the sensed distance data and, if appropriate, calculates a possible strategy for parking.

A disadvantage with the known systems is the fact that basically the traffic space to the side of the vehicle is measured, so that the size of the parking space cannot be determined until the vehicle to be parked is already located directly next to it or has even already passed it. Owing to the high traffic density it is therefore often virtually impossible in real road traffic for the vehicle to brake and initiate the parking procedure, or even reverse to the detected parking space, in good time without constituting a traffic hazard.

SUMMARY OF THE INVENTION

An object of the present invention is to provide a method and a device for detecting a suitable parking space in such good time that the vehicle can be stopped and parked safely.

The present invention provides a device for detecting parking spaces for vehicles including a distance-measuring beam-type sensor system for detecting free areas in the traffic space which could potentially constitute a parking space, and which is assigned a unit for signal processing in order to examine the traffic space in terms of its dimensions and its suitability for parking after the free traffic space has been detected. The beam-type sensor system is oriented on the road vehicle in such a way that the measuring beams which are to be used for detecting parking spaces within the scope of the signal processing are directed into the area in front of the vehicle.

The present invention also provides a method for detecting parking spaces for vehicles. According to the method, free areas in the traffic space which could potentially constitute a parking space are detected by means of a distance-measuring beam-type sensor system. Within the scope of the signal processing, the free areas in the traffic space are examined in terms of their dimensions and their suitability for parking, characterized in that, within the scope of the detection and signal processing, only those echo signals of the beam-type sensor system which essentially originate from the area in front of the vehicle are evaluated.

BRIEF DESCRIPTION OF THE DRAWING

The invention will be elaborated upon below based on exemplary embodiments with reference to the drawing, in which.

DETAILED DESCRIPTION

Figure 1:
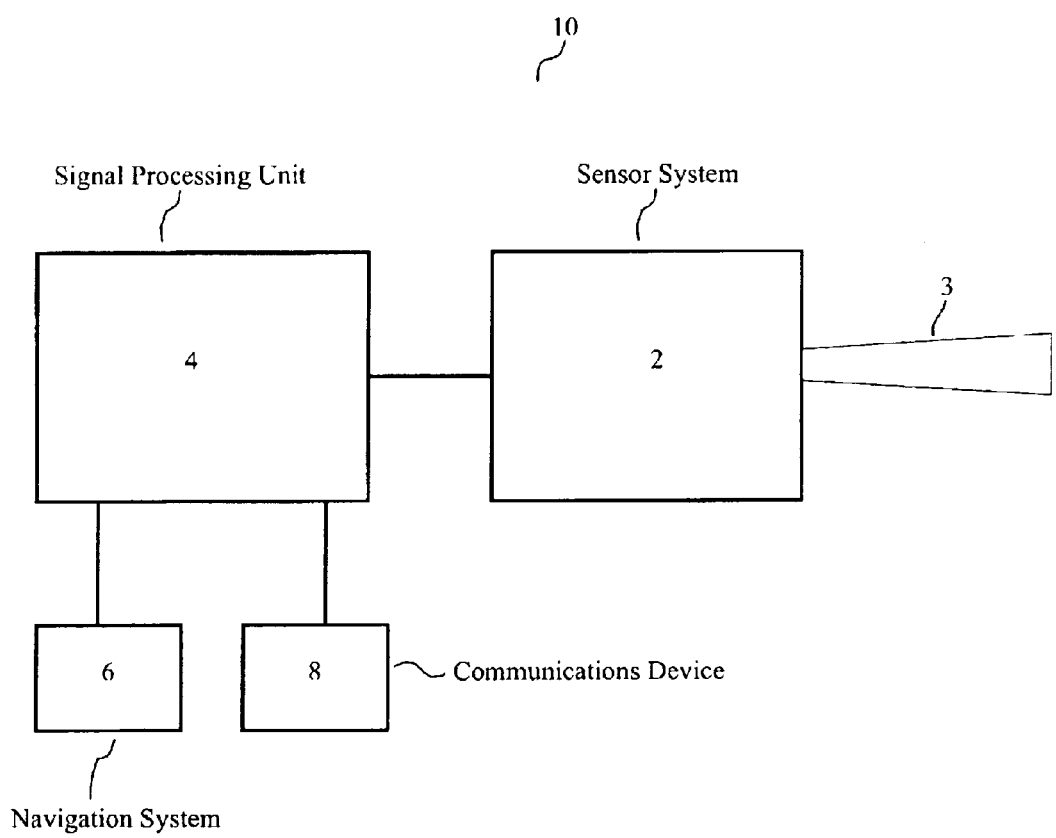
FIG. 1 shows a schematic diagram of a device for detecting parking spaces for vehicles.

Referring to FIG. 1, device 10 for detecting parking spaces for vehicles includes sensor system 2 connected to signal processing unit 4. Sensor system 2 emits beam 3. In an embodiment, signal processing unit 4 is connected to navigation system 6 and/or communications device 8.

Within the scope of the invention, a beam-type sensor system is particularly advantageously used and is oriented on the vehicle in such a way that, in order to achieve the object according to the invention, it basically irradiates the area located in front of the vehicle. This embodiment of the invention makes it possible to detect a potential parking space in good time within the scope of the processing of the echo signals of the beam-type sensor system so that there is sufficient time to examine said parking space with respect to its suitability for parking within the scope of the signal processing and, if appropriate, to brake the vehicle safely until such a parking space is reached.

A millimeter wave radar can particularly advantageously be used as a distance-measuring beam-type sensor system. A radar system which can be used within the scope of the invention is described in patent document DE 196 00 059 C2. This document discloses a motor vehicle radar arrangement in which more wide ranging information about the traffic situation located in front of the vehicle and the course of the road is acquired by evaluating echo signals which are deflected on the road. In accordance with the system disclosed in this patent document, a millimeter wave radar with a narrow antenna lobe (for example less than 2°) can advantageously be used to sense the surroundings of the vehicle essentially in the driving direction, in terms of distance and azimuth. Preferred sensing areas are at distances of 0 to 70 meters and azimuth angles of 0° to 10° (towards areas at the edge of the road) here. The sensing area may be effected sequentially here by pivoting or switching over an individual beam direction or else in a plurality of beam directions in parallel. In the particular case of the radar sensor system, reflections on the surface of the road have the effect that not only objects which can be viewed on a direct path are mapped but also, for example, the underside of vehicles and objects which are located within the space between individual vehicles. As a result, the resulting radar image shows vehicles located in the scene in their entire dimensions, as it were in a view from above (bird's-eye view). Free areas between the vehicles can thus be detected even if in the direct line of sight from the instantaneous position of the sensor they are concealed by individual vehicles or even a plurality of vehicles. Therefore, at least one evaluation criterion in the examination as to whether a potential parking space is actually suitable for parking the vehicle can particularly advantageously be the geometric analysis of the length, width and orientation of the gap. It is advantageous especially for economic considerations if the beam-type sensor used within the scope of the invention is already part of a sensor system located in the vehicle for other purposes, for example of a system for controlling distances. It is also conceivable to make use in such systems of possibly also available processor power for the processing functions for detecting parking spaces. Of course, the viewing angle of the beam-type sensor used does not need to be limited to the area in front of the vehicle. It may also be an arrangement of a plurality of sensors that observe a large area surrounding the vehicle. However, for the invention it is important that an area in front of the vehicle is irradiated and the echo signals resulting from this area can be fed to a signal processing means.

If the device for searching for a parking space is connected to a navigation system, additional cartographic information about the area sensed by the beam-type sensor system can advantageously also be taken into account within the scope of the processing of the echo signals. In this way, it is possible to more reliably avoid a situation in which, for example, narrow points on roads, bus stops or other prohibited areas are misinterpreted as possible parking areas.

In particular in terms of safety it is advantageous if the system for detecting parking spaces is connected to a communications device. In this way, information on whether a parking space has been detected or a safety-related object has been detected in the space between parked vehicles can be passed on to persons or systems located in or outside the vehicle. Here, the information may be composed of acoustic, visual or haptic signals. Such signals are passed on, in particular in the form of warning signals, to the vehicle occupants, in particular the driver of the vehicle. However, road safety can also be increased by transmitting the signals to road users outside the motor vehicle. Thus, people who are at risk of running into moving traffic from the space between parked vehicles or in front of stopped vehicles can be warned by horn signals and light signals. On the other hand, it is also possible to inform the traffic behind in good time about an imminent braking procedure which initiates the parking operation. Within the scope of, for example, an intelligent parking space monitoring and assignment system in town centres or a system for providing information on free parking spaces it is also very easily conceivable for the novel system for detecting parking spaces to transmit the information about a free parking space to a central administration system or to other vehicles by means of the communications device even in those cases in which it is not intended to park the vehicle.

In order to increase road safety further, it is possible, after the detection of a free traffic space, to check, in particular within the scope of the determination of its geometric dimensions, whether objects with a relatively small extent are located within the extended areas. Thus, it may very easily be the case that in a suitable parking space there is, for example, a two-wheeled vehicle, a person, an animal or even a child's toy. By tracking such objects over a plurality of chronologically successively generated data records (image sequences) it is also possible to detect whether they are moving in the direction of the road in a way which could endanger traffic.

The two-dimensional data records which are sensed or generated by means of the sensor system can advantageously be processed by means of known image-processing algorithms (contour analysis, object formation, object tracking, etc.).

In addition to detecting a parking space, the invention can, of course, also be used to detect persons or moving objects located between parked or in front of stopped vehicles.

What is claimed is:

1. A device for detecting parking spaces for vehicles, comprising:
    a distance-measuring beam-type sensor system disposed on a road vehicle and configured to direct a measuring beam into an area in front of the vehicle so as to detect a free area in a traffic space, the free area being a potential parking space; and
    a signal processing unit configured to examine, upon a detecting of the free area, a dimension of the free area and a suitability of the free area for parking.

2. The device for detecting parking spaces as recited in claim 1 wherein the beam-type sensor system includes a millimeter wave radar.

3. The device for detecting parking spaces as recited in claim 1 wherein the device is connected to a navigation system configured to provide cartographic information on the free area.

4. The device for detecting parking spaces as recited in claim 1 further comprising a communications device configured to communicate, upon the detecting of the free area, information about the free area.

5. The device for detecting parking spaces as recited in claim 4 wherein the communications device is configured to communicate the information about the free area to at least one of a person and a system disposed at least one of inside and outside the vehicle.

6. A method for detecting parking spaces for vehicles, comprising:
    detecting a free area in a traffic space using a distance-measuring beam-type sensor system, the free area being a potential parking space; and
    examining, using signal processing, a dimension of the free area and a suitability of the free area for parking based on echo signals of the beam-type sensor system originating from an area in front of a vehicle.

7. The method as recited in claim 6 wherein the echo signals are millimeter waves.

8. The method as recited in claim 7 further comprising providing, to at least one of a person and a system disposed at least one of inside and outside the vehicle, information generated by the signal processing.

9. The method as recited in claim 6 further comprising combining the echo signals so as to form two-dimensional data fields.

10. The method as recited in claim 9 wherein the two-dimensional data fields are capable of being processed using a signal evaluation based on image processing algorithms.

11. The method as recited in claim 9 further comprising determining a position of a parked vehicle using a first two-dimensional data field of the two-dimensional data fields or a sequence of the two-dimensional data fields, wherein the free area includes a gap between the parked vehicle and another vehicle, and wherein the examining includes evaluating the gap separately from the determining.

12. The method as recited in claim 11 wherein the signal processing includes determining geometric information relating to the free area.

13. The method as recited in claim 12 wherein the geometric information includes the dimension of the free area and an orientation of the free area relative to a road.

14. The method as recited in claim 12 wherein the signal processing includes generating a message from the geometric information.

15. The method as recited in claim 14 wherein the message includes at least one of a position, a size and an orientation of the gap with respect to the road.

16. The method as recited in claim 14 wherein the message is for at least one of a person and a system disposed at least one of inside and outside the vehicle.

17. The method as recited in claim 11 wherein the evaluating is performed using information about surroundings of the vehicle.

18. The method as recited in claim 17 further comprising receiving the information from a navigation system.

19. The method as recited in claim 11 wherein the evaluating includes detecting an object disposed in the gap.

20. The method as recited in claim 19 wherein the evaluating includes checking the detected object so as to determine whether the object is moving in a direction of a road.

21. The method as recited in claim 6 wherein the detecting includes detecting persons or moving objects disposed between parked vehicles.

22. The method as recited in claim 6 wherein the detecting includes detecting persons or moving objects disposed in front of a stopped vehicle.

\* \* \* \* \*